US009503981B2

(12) United States Patent
Baglin et al.

(10) Patent No.: US 9,503,981 B2
(45) Date of Patent: Nov. 22, 2016

(54) APPARATUS AND METHOD FOR OPERATIONAL STATE SYNCHRONIZATION IN A WIRELESS COMMUNICATION SYSTEM

(71) Applicant: Google Technology Holdings LLC, Mountain View, CA (US)

(72) Inventors: Matthieu Baglin, Toulouse (FR); Suryaminjata Gunawan, Austin, TX (US); Jamie J. Li, Austin, TX (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/389,020

(22) PCT Filed: Mar. 14, 2013

(86) PCT No.: PCT/US2013/031147
§ 371 (c)(1),
(2) Date: Sep. 29, 2014

(87) PCT Pub. No.: WO2013/148226
PCT Pub. Date: Oct. 3, 2013

(65) Prior Publication Data
US 2015/0085727 A1 Mar. 26, 2015

(30) Foreign Application Priority Data
Mar. 30, 2012 (EP) .................................... 12290115

(51) Int. Cl.
*H04W 52/02* (2009.01)
*H04W 76/02* (2009.01)
(Continued)

(52) U.S. Cl.
CPC ....... *H04W 52/0225* (2013.01); *H04W 76/028* (2013.01); *H04W 76/046* (2013.01); *H04W 56/00* (2013.01)

(58) Field of Classification Search
None
See application file for complete search history.

(56) References Cited

U.S. PATENT DOCUMENTS

| | | | | |
|---|---|---|---|---|
| 8,885,517 B2* | 11/2014 | Deivasigamani ... | H04W 76/046 | 370/254 |
| 2004/0224709 A1* | 11/2004 | Yi ....................... | H04W 76/027 | 455/515 |

(Continued)

FOREIGN PATENT DOCUMENTS

WO        0245456 A1     6/2002

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)". 3GPP Standard; 3GPP TS 36.331, 3rd Generation Partnership Project (3GPP). Mobile Competence Centre ; 650, Route Des Lucioles ; F-06921 Sophia-Antipolis Cedex; France, vol. RAN WG2, No. V10.4.0, Dec. 20, 2011, pp. 1-296, XP050555028, (being submitted in 2 parts).

(Continued)

*Primary Examiner* — Eunsook Choi
(74) *Attorney, Agent, or Firm* — Lerner, David, Littenberg, Krumholz & Mentlik, LLP

(57) ABSTRACT

A method (300) and user equipment (110) that are for operation in a wireless communication system (100) maintain system state synchronization between a fixed network (130) of the wireless communication system and the user equipment by performing a receipt (305) of a message from a network station (105) while the user equipment is in a connected state (220); a determination (310) that the message includes an address of the user equipment and that the message is a message that should not be generated while the fixed network has the user equipment logged as being in the connected state; and a switching (315) of the user equipment to an idle state (215).

15 Claims, 3 Drawing Sheets

(51) Int. Cl.
*H04W 76/04* (2009.01)
*H04W 56/00* (2009.01)

(56) References Cited

U.S. PATENT DOCUMENTS

| | | | | |
|---|---|---|---|---|
| 2006/0246924 | A1* | 11/2006 | Balasubramanian | H04W 68/00 455/459 |
| 2010/0130205 | A1* | 5/2010 | Jung | H04W 36/0066 455/435.2 |
| 2010/0279676 | A1* | 11/2010 | Benn | H04W 52/0216 455/419 |
| 2011/0182269 | A1* | 7/2011 | Yamagishi | H04W 76/028 370/331 |
| 2011/0183662 | A1 | 7/2011 | Lee et al. | |
| 2013/0252641 | A1* | 9/2013 | Pampu | H04W 8/08 455/456.5 |
| 2013/0331057 | A1* | 12/2013 | Kodali | H04W 76/027 455/404.1 |
| 2014/0269637 | A1* | 9/2014 | Banister | H04L 5/0078 370/336 |
| 2015/0215757 | A1* | 7/2015 | Miskiewicz | H04W 4/22 455/404.1 |

OTHER PUBLICATIONS

"3rd Generation Partnership Project; Technical Specification Group Radio Access Network; Radio Resource Control (RRC); Protocol specification (Release 11)". 3GPP Standard; 3GPP TS 25.331, 3rd Generation Partnership Project (3GPP), Mobile Competence Centre; 650, Route Des Lucioles; F-06921 Sophia-Antipolis Cedex; France, vol. RAN WG2, No. V11.0.0, Jan. 3, 2012, pp. 1-1909, XP050555149, (being submitted in 5 parts).

International Search Report and Written Opinion for Application No. PCT/US2013/031147 dated Apr. 24, 2013.

Vodafone: "Periodic Updates in Connected State". 3GPP Draft; R2 085702 Periodic Updates in Connected State, 3rd Generation Partnership Project (3GPP), Mobile Competence Centre ; 650, Route Des Lucioles ; F-06921 Sophia-Antipolis Cedex ; France, No. Prague. Czech Republic; Oct. 1, 2008, XP050320694.

Vodafone: "Periodic Updates in Connected State". 3GPP Draft; R2 086960. 3rd Generation Partnership Project (3GPP). Mobile Competence Centre ; 650. Route Des Lucioles ; F-06921 Sophiaantipolis Cedex ; France, No. Prague. Czech Republic; Nov. 13, 2008, XP050321938.

* cited by examiner

US 9,503,981 B2

APPARATUS AND METHOD FOR OPERATIONAL STATE SYNCHRONIZATION IN A WIRELESS COMMUNICATION SYSTEM

CROSS-REFERENCE TO RELATED APPLICATIONS

The present application is a national phase entry under 35 U.S.C. §371 of International Patent Application No. PCT/US2013/031147, filed Mar. 14, 2013, published in English, which claims the priority from EP Application No. 12290115.0, filed Mar. 30, 2012, the disclosures of which are incorporated herein by reference.

FIELD OF THE INVENTION

The present invention relates generally to wireless communication systems, and more particularly to a synchronization of a user equipment state with the network record of the user equipment state.

BACKGROUND

In many wireless communication systems, the user equipment operates in several states, of which two very common states are a connected state and an idle state. The connected state is typically used when the user equipment is communicating information that is being received or transmitted at the user's request, such as for answering or initiating voice or test messaging, performing web browsing, and performing content (images, music, or video, for example) upload or download. The idle state is used when the user equipment does not need to convey such information but is important because the communication system is designed so that the user equipment uses far less power in the idle state. The user equipment in the idle state still communicates with the system for many purposes. Among the purposes are to update the location of the user equipment that is maintained in the fixed network, so that when the network and the user equipment are to be connected, the devices know which network station is most likely to be used. Other purposes are for the network to command the user equipment to enter the connected state, to maintain the system time in the device, and many other purposes. While in the connected state, it is possible in many systems for the user equipment to continue some of the operations that are also performed in the idle state. A problem can arise when the state of the user equipment is logged by the network as the idle state while the user equipment is actually in the connected state. This has the adverse affect of causing excessive battery consumption and can degrade the user experience because the user equipment cannot communicate with the network while its operational state is unsynchronized with the network.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

Figure 1:
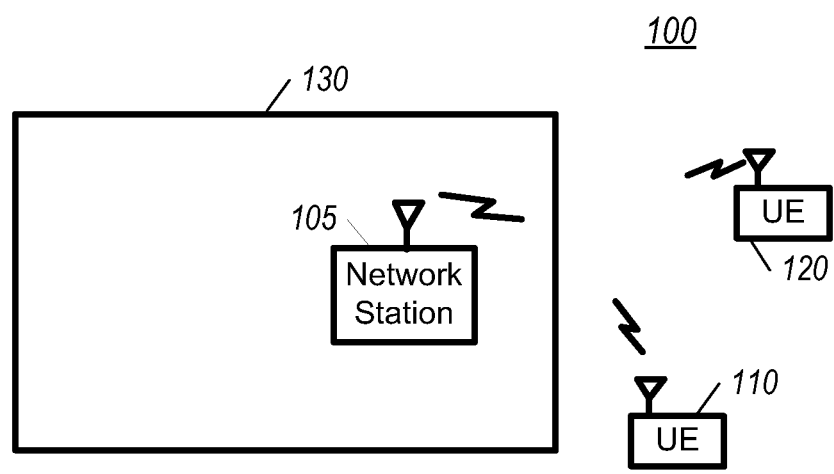
FIG. 1 is a block diagram of a communication system, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to maintaining state synchronization between a user equipment and a radio communication network.

Referring to FIG. 1, a simplified block diagram of a wireless communication system 100 is shown, in accordance with certain embodiments. The wireless communication system 100 may comprise a fixed network 130 that comprises many network stations that are connected to one or more central controllers. FIG. 1 shows one of the network stations, network station 105. The wireless communication system 100 may comprise many user equipments such as portable telephones, portable pads, portable and mobile computers, portable and mobile instrumentation devices, and the like, that are equipped with a wireless modem that is compatible with the communication system 100. Two such user equipments 110, 120 are shown in FIG. 1. The wireless communication system 100 may be any wireless communication system in which the user equipment 110 operates in at least two states: an idle state and a connected state, although the states may have different names in some communication systems. In many systems all of the user equipments would have these two states. Just a few examples of such systems are commonly referred to as CDMA IS-95, GSM, CDMA2000 EV-DO, UMTS, 3GPP UMB, and 3GPP LTE. The wireless communication system 100 may also be referred to herein as the network 100.

Figure 2:
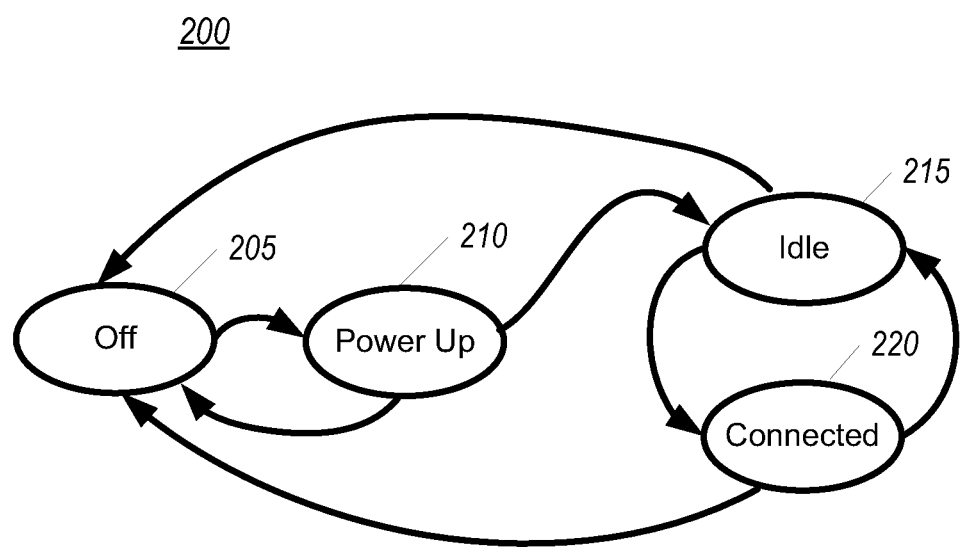
FIG. 2 is a state diagram of a user equipment, in accordance with certain embodiments.

Referring to FIG. 2, a state diagram 200 shows some of the possible states of the user equipment 110 and other user equipments operating in communication system 100, in accordance with certain embodiments. There are four states shown: off state 205, power up state 210, idle state 215, and connected state 220. In the off state 205, the user equipment 110 consumes extremely small amounts of power—basically just enough to detect a user indication to power up the user equipment 110. From the off state, the user equipment 110 moves to the power up state, in which state processors of the user equipment 110 are booted up and perform certain self check functions (e.g., memory checks and battery check). Other functions that are not performed in the idle state 215 and connected state 220 may also be performed in the power up state 210. From the power up state 210, the user equipment 110 can go back into the off state 205, for example, if the user performs a power off command or if the charge state of the battery of the user equipment 110 is determined to be too low. In normal circumstances, however, the user equipment 110 will go into the idle state 215. As noted above, in the idle state, the user equipment 110 communicates with a nearby network station 105 to establish with the fixed network 130 that the user equipment is now active and in the idle state 215, and to perform other system maintenance functions such as maintaining communications with a nearby network station while the user equipment moves within the geographic area of the communication system 100, maintaining a system clock, and monitoring paging and control messages from the fixed network 130, some of which can cause the user equipment 110 to go into the connected state 220.

The transition from the idle state 215 to the connected state 220 may require that several messages be successfully exchanged between the fixed network 130 and the user equipment 110. These would be messages that are specified in the system specifications for the particular wireless communication system 100. The connected state 220 is used for the transfer of information that is typically perceptible to the user, in forms such voice, music, video streaming, audio streaming, an interactive web browser, user generated commands, etc, and which may generally be referred to as data communications. The connected state 220 is often entered in response to an action of the user of the user equipment 110, such as activating a telephone call initiation button, a telephone call answer button, completing a command to connect to a website, etc. But a transition to the connected state 220 could arise without a command from the user of the user equipment 110. For example, the network could page the user equipment to initiate a mobile terminated voice call. The user equipment 110 may transition back the idle state 115, and could do so as a result of certain actions of the user of the user equipment 110, such as activating a call hang up button, or a completing a command to disconnect from a website. Another action that could cause the user equipment 110 to transition back to the idle state 115 is another party to a voice connection terminating a call.

In some embodiments, when the user equipment 110 detects that the user equipment 110 has lost radio connection to the network 100, the user equipment 110 reverts to the idle state 215 and re-establishes a connection. Additionally, the off state 205 can be entered from either the idle state or connected state, for example, by command from the user of the user equipment 110. While the user equipment is in the connected state 220, it typically performs at least some of the functions that can also be performed in the idle state. These functions may be performed in apparent simultaneity with other functions being performed in the connected state 220. For example, during a voice call, the user equipment can monitor messages on a paging and/or control channel without any interruption to the audio of a voice call that is carried on a data channel, by using time and/or frequency multiplexing techniques. When the user is performing data communications, the monitoring of paging and control messages would typically slow down such data communications only imperceptibly, or not at all.

In spite of system designs that attempt to avoid them, situations can arise wherein the user equipment 110 is in the connected state 220 but the fixed network 130 has the user equipment 110 logged as being in the idle state 215, i.e., the user equipment 110 internal state and the state of the user equipment 110 as logged by the network 100 are out of synchronization, or, more simply put, the user equipment state 110 is out of synchronization with the network 100. This situation causes excessive power drain in the user equipment 110 and can create a negative user experience because the user equipment and the network would then be unable to communicate with each other until this mismatch is corrected. This situation can arise in many systems, and the cause may not always be tracked down. One specific known example of this situation occurs in a current implementation of an Evolved UMTS Terrestrial Radio Access Network (E-UTRAN), which is the radio network used in 3GPP ($3^{rd}$ Generation Partnership Project) LTE (Long Term Evolution) systems. In this implementation, it was found to arise in the following exchange of messages: a connection release message is sent from the network station (NS) to a user equipment (UE). The UE sends back a non-acknowledgment (NACK) message due to errors. In the meantime, the NS sends a security mode command that requires the UE to encrypt and decrypt subsequent messages, and again sends the connection release message. The UE goes into the security mode, acknowledges the security mode command, but does not act upon the retransmitted connection release message because it is not encrypted. The UE remains in the connected state 220 but the fixed network 130 logs the UE as being in the idle state.

Another example of the UE state being out of synchronization with the network 100 is when a radio link becomes unusable between the network station 105 and the UE 110. In this instance, the network 100 may log the UE 110 as being in the idle state 215 very quickly but the UE 110 may stay in the connected state 220 for a long time. A long duration of this unsynchronized state may occur, without using some of the unique techniques describe herein below. For example, when the UE 110 is in an LTE system and connected in the DRX mode, the condition could last a long time, one reason being because the UE monitors less frequently the radio link when it is in the DRX mode. In some embodiments, methods other than those described below, such as timer methods, may cause the UE to go back to the idle state. These are just some examples of how the situation can arise in an LTE system. The situation can arise in other types of communication systems, for similar reasons.

Figure 3:
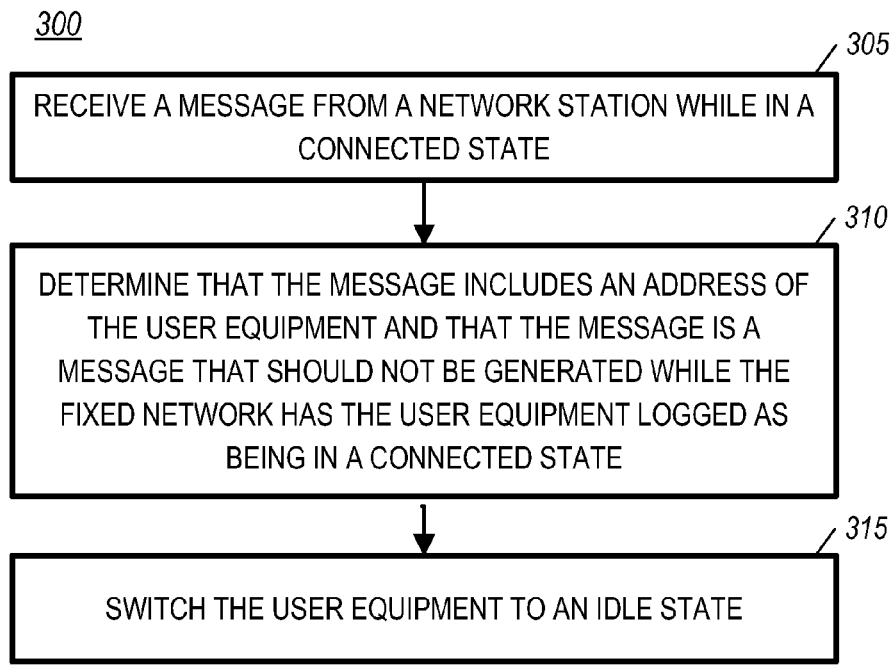
FIGS. 3-6 are flow charts showing some steps performed by the user equipment of FIGS. 1-2, in accordance with certain embodiments.

Referring now to FIG. 3, a flow chart 300 shows some steps of a method for operational state synchronization in the user equipment 110 of wireless communication system 100, in accordance with certain embodiments. At step 305 a message is received from a network station while a user equipment is in the connected state 220. As noted above, the connected state 220 allows the user equipment to engage in a circuit switched voice call or in packet switched web-browsing, or in other packet switched data communication activities, such as uploading or downloading content, such as video or music, using a radio resource (radio spectrum and time allocation) that has been assigned for such purposes. In terms of 3GPP LTE system specifications, the radio resource is identified as a data radio bearer (DRB) or a multimedia broadcast multicast service radio bearer (MRB). The DRB resource is for data communication between one user equipment and the fixed network 130, while the MRB allows the broadcast of data communications from the fixed network 130 to a group of user equipments. Radio resources for data communications are not assigned to a user equipment for use while in the idle state 215. At step 310, the user equipment determines that the message received in step 305 includes an address of the user equipment and that the message is a message that should not be generated while the fixed network has the user equipment logged as being in the connected state 220. The user equipment switches itself at step 315 to the idle state in response to this determination. This action re-synchronizes the state of the user equipment with the state in which the fixed network 130 has the user equipment logged.

Figure 4:
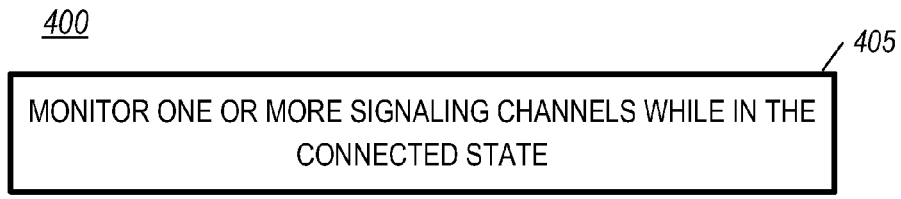

Referring to FIG. 4, a flow chart 400 shows a step 405 of a method for operational state synchronization in the wireless communication system 100, in accordance with certain embodiments. The user equipment monitors at least one signaling channel while in the connected state. Signaling channels may be defined in some systems as paging or control channels. A signaling channel is assigned different radio resources than those assigned for data communications. The message that should not have been generated while the network has the user equipment logged as being in the connected state is one of a paging and a control message received on the signaling channel. In terms of 3GPP LTE system specifications, the radio resource is identified as a signaling radio bearer (SRB). An SRB may bear a common control channel (CCCH), and the message that should not have been generated is a common control channel message. The user equipment can access the SRB while simultaneously communicating data using a DRB or MRB by means of time and/or frequency multiplexing.

Figure 5:
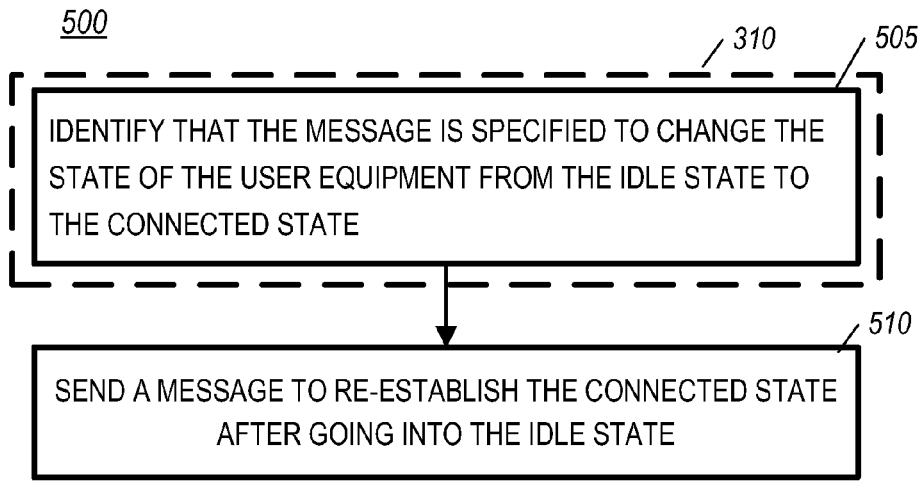

Referring to FIG. 5, a flow chart 500 shows two steps of a method for operational state synchronization in the wireless communication system 100, in accordance with certain embodiments. Step 505 expresses one embodiment of step 310 (FIG. 3), in which the determining of step 310 further comprises identifying at step 505 that the message is specified to change the state of the user equipment from the idle state to the connected state. When such is the case, the user equipment at step 510 autonomously sends a connection establishment message to the wireless communication system to re-establish the connected state after having gone into the idle state at step 315 (FIG. 3).

The user equipment may also perform other actions specified by the message. For example, the message may be a message addressed specifically to the user equipment address that defines system parameters changes for the user equipment. The user equipment would implement those parameter changes before attempting to re-establish the connection. In the example of the 3GPP LTE system, when the message is a paging message addressed to the user equipment, the paging message elicits what is known as a Service Request that would normally change the state of the user equipment from the idle state 215 to the connected state 220. The same technique described with reference to steps 305-315 and 505-510 may be used in a Global System for Mobile communications (GSM) and Universal Mobile Telephone System (UMTS) that are appropriately adapted to monitor signaling channels for messages that would normally cause the user equipment to change from the idle state 215 to the connected state 220. In a GSM system that is designed in accordance with certain embodiments, the user equipment may be designed to monitor the paging sub-channels on the channels identified as CCCH or PCCCH while in the connected state. If a paging message is detected, step 510 is performed. In a UMTS system that is designed in accordance with certain embodiments, the user equipment may be designed to monitor the channel identified as PCCH while in the connected state. If a PAGING TYPE 1 message is detected, step 510 is performed.

Figure 6:
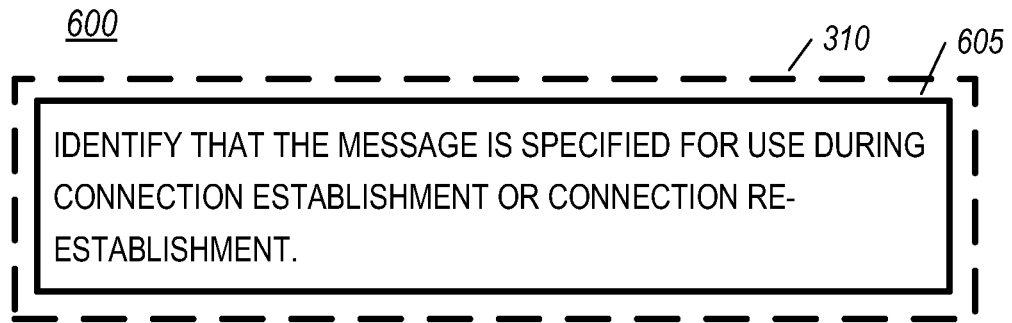

Referring to FIG. 6, a flow chart 600 shows a step of a method for operational state synchronization in the wireless communication system 100, in accordance with certain embodiments. Step 605 expresses one embodiment of step 310 (FIG. 3), in which the determining of step 310 further comprises identifying at step 605 that the message is a control message specified for use during connection establishment or connection re-establishment. In this instance, the step 315 of switching the equipment in to the idle state is performed and the method ends without sending a response to the network station (NS) even though a response may be specified. The user equipment performs the functions normally specified in the idle state. In the example of the 3GPP LTE system, the message is one of an RRCConnectionReject message, an RRCConnectionSetupmessage, an RRCConnectionReestablishment message, and a RRCConnectionReestablishmentReject In certain embodiments the message described with reference to steps 305 and 310 of FIG. 3 is any message that is not specified to require a response message from the user equipment (but, as noted in step 310, should not have been generated while the fixed network has the user equipment logged as being in the connected state 220). In this instance, step 315 of switching the user equipment to the idle state is performed and the method ends without sending a response to the network station (NS). The user equipment performs the functions normally specified in the idle state.

Figure 7:
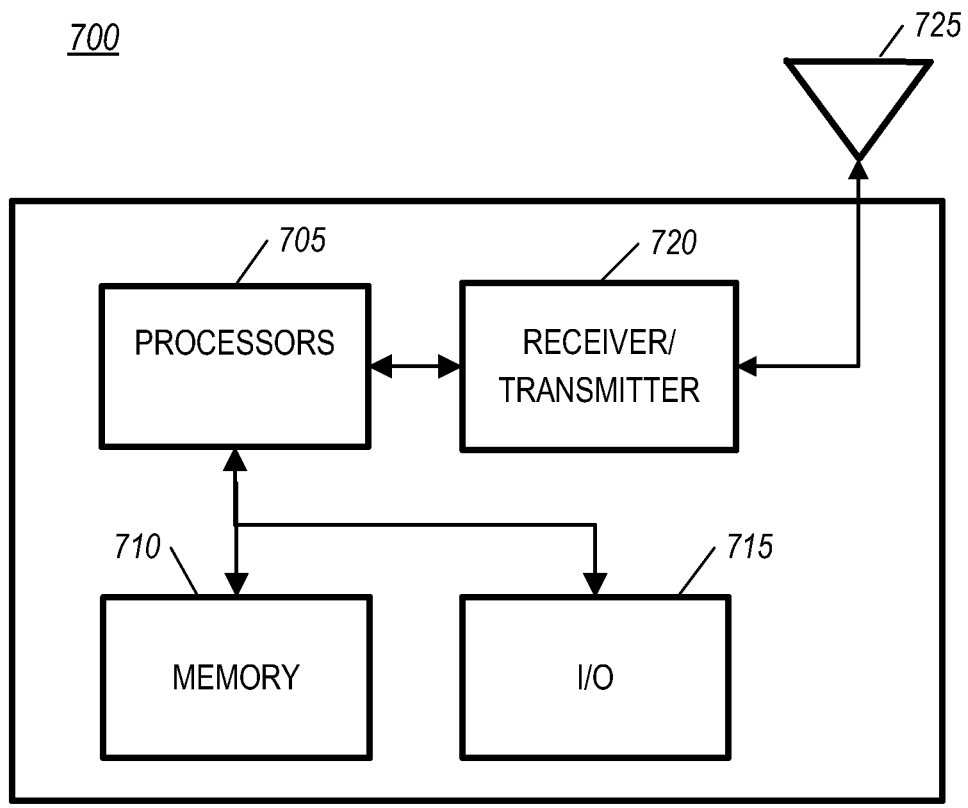
FIG. 7 is a block diagram of a user equipment capable of performing the functions of FIGS. 1-6, in accordance with certain embodiments.

FIG. 7 is a block diagram of a device 700 that includes a transceiver 720, in accordance with certain embodiments. The device 700 is capable of performing the functions described herein for user equipments 110, 120. The device 700 includes one or more processors 705, each of which may include such apparatuses as central processing units, cache memory, instruction decoders, and timers, just to name a few. The processors execute program instructions which could be stored within memory locations that are within the processors, or may stored in a memory 710 to which the processors 705 are bi-directionally coupled. The processors 705 may include input/output interface circuitry and may be coupled to input/output interface circuitry 715 that is external to the processors 705. A portion of the input/output circuitry may be used to interface with a user of the device 700. The processors 705 are further coupled to a radio transceiver 720 which includes a radio transmit function and a radio receive function. The transceiver 720 is coupled to a radio antenna 725. In some embodiments, the processors 705 may be coupled to the transceiver 720 through the input/output function 715. The transceiver 720 may comprise one or more processors and memory, in addition to circuits that are unique to radio functionality. The device 700 may be a personal communication device such as a cell phone, a tablet, or a personal computer, or may be any other type of radio communication device operating in a radio network such as network 100. The radio network may be any type of network in which device 700 has at least and idle state and a connected state, such as cellular communication networks, other wide area networks, local networks such as Wi-Fi networks, or cable mesh networks, or military networks. In some embodiments, the device 700 is an LTE (Long Term Evolution) UE (user equipment) that operates in a 3GPP ($3^{rd}$ Generation Partnership Project) network.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 3-6, may be performed using programmed instructions contained on a computer readable medium which may be read by processor of a CPU. A computer readable medium may be any tangible medium capable of storing instructions to be performed by a microprocessor. The tangible medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method used by a user equipment for maintaining system state synchronization between a fixed network of a communication system and the user equipment comprises:
    receiving a message from a network station while the user equipment is in a connected state;
    determining that the message includes an address of the user equipment and that the message is a message that is generated while the fixed network has the user equipment logged as being in an idle state; and
    switching the user equipment to the idle state in response to the determining.

2. The method according to claim 1, further comprising monitoring one or more signaling channels while in the connected state, and wherein the message is one of a paging and a control message.

3. The method according to claim 1, wherein the determining further comprises identifying that the message is specified to change the state of the user equipment from the idle state to the connected state, the method further comprising:
    sending a connection establishment message to re-establish the connected state after going into the idle state.

4. The method according to claim 3, wherein the wireless communication system is a 3GPP LTE system and the message is a paging message.

5. The method according to claim 3, wherein the wireless communication system is one of a GSM 2G system and a UMTS system.

6. The method according to claim 1, wherein the determining further comprises identifying that that message is a control message specified for use during connection establishment or connection re-establishment.

7. The method according to claim 6 wherein the wireless communication system is a 3GPP LTE system, and wherein the message is one of an RRCConnectionReject message, an RRCConnectionSetupmessage, and RRCConnectionReestablishment message, and an RRCConnectionReestablishmentReject.

8. The method according to claim 6, further comprising not sending a response to the message from the network station regardless of whether or not the message specifies a response.

9. A user equipment, comprising:
    a signal transmitter and a signal receiver;
    memory for storing programming instructions; and
    one or more processors that are controlled by the programming instructions to perform the following functions:
        receiving a message by the receiver of the user equipment from a network station while the user equipment is in a connected state;
        determining that the message includes an address of the user equipment and that the message is a message that is generated while a fixed network of a wireless communication system has the user equipment logged as being in an idle state; and switching the user equipment to the idle state in response to the determining.

10. The user equipment according to claim 9, wherein the determining further comprises identifying that the message is specified to change the state of the user equipment from the idle state to the connected state, and wherein the one or more processors perform a function of:

sending a connection establishment message to re-establish the connected state after the user equipment goes into the idle state.

11. The user equipment according to claim 9, wherein the determining further comprises identifying that that message is a control message specified for use during connection establishment or connection re-establishment.

12. A tangible media comprising programmed instructions that, when executed by a processor of a user equipment operating in a wireless communication system comprising a fixed network, performs the following functions:

receiving a message from a network station while the user equipment is in a connected state;

determining that the message includes an address of the user equipment and that the message is a message that is generated while the fixed network has the user equipment logged as being in an idle state; and switching the user equipment to the idle state in response to the determining.

13. The tangible media according to claim 12, wherein the determining further comprises identifying that the message is specified to change the state of the user equipment from the idle state to the connected state, and wherein the programmed instructions perform a function of:

sending a connection establishment message to re-establish the connected state after the user equipment goes into the idle state.

14. The tangible media according to claim 13, wherein the wireless communication system is one of a 3GPP LTE system, a GSM 2G system and a UMTS system.

15. The tangible media according to claim 12, wherein the determining further comprises identifying that that message is a control message specified for use during connection establishment or connection re-establishment.

* * * * *